Jan. 16, 1968     D. R. HAMMETT     3,363,718
SKIRTS FOR GAS-CUSHION VEHICLES
Filed Oct. 23, 1965     2 Sheets-Sheet 2

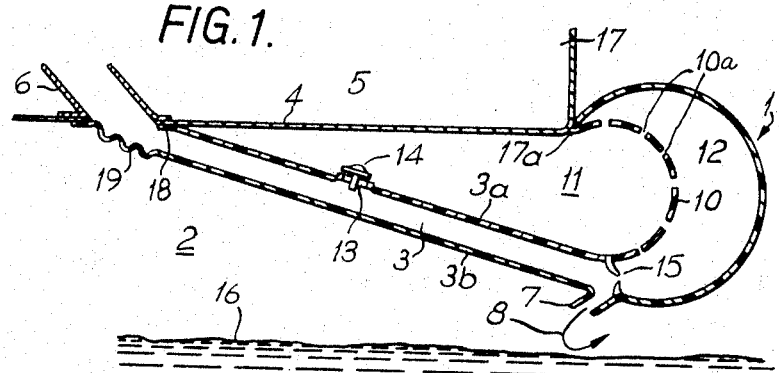
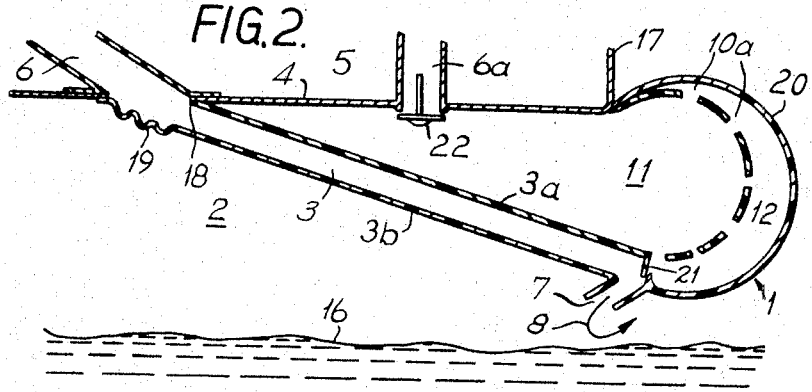
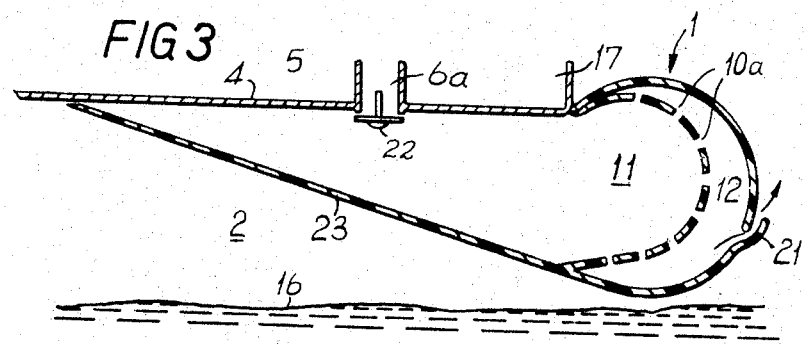

INVENTOR
D. R. HAMMETT
BY
Cameron, Kerkam & Sutton
ATTORNEYS

United States Patent Office 3,363,718
Patented Jan. 16, 1968

3,363,718
SKIRTS FOR GAS-CUSHION VEHICLES
David Rodgers Hammett, Hythe, Southampton, England, assignor to Hovercraft Development Limited, London, England, a British company
Filed Oct. 23, 1965, Ser. No. 502,913
Claims priority, application Great Britain, Dec. 1, 1964, 48,741/64
10 Claims. (Cl. 180—128)

ABSTRACT OF THE DISCLOSURE

In a gas-cushion vehicle of the type wherein the vehicle-supporting cushion is contained by a wall or skirt attached to the vehicle body, vertical oscillation of the wall structure is reduced by making the wall structure of hollow construction and dividing it internally into a pair of chambers separated by a permeable diaphragm. Pressurized air is supplied to one of the chambers, and oscillation of the wall structure is damped by the dissipation of energy resulting from a forcing of the air thus supplied to the first chamber into the other or second chamber by way of the permeable diaphragm. The second chamber is vented so as to avoid an excessive build-up of pressure therein.

---

This invention relates to gas-cushion vehicles, that is to say vehicles for travelling over a surface and which, in operation, are supported above that surface, at least in part, by cushion of pressurized gas formed and contained beneath the vehicle body.

The invention particularly relates to gas-cushion vehicles wherein the cushion is contained, at least in part, by a flexible wall structure depending from the vehicle body.

It is an advantage to make such a wall structure hollow so that it may be inflatable to conform to a desired shape and to design it so that the stresses induced by inflation are tensile ones as this enables thin, light materials to be used. Furthermore, the hollow, inflatable, wall structure, having a closed shape, can avoid the danger of "scooping" which action increases the loads on the wall structure. A hollow, inflatable wall structure also ensures that deflection thereof results in bending or flexing of the structure material rather than buckling, thus extending the useful life of the wall structure.

However, simple inflatable wall structures have a particular load deflection characteristic which does not vary. Being undamped deflectable members, when deflected, they are liable to oscillate even when the condition causing oscillation has ceased to exist.

The invention provides a gas-cushion vehicle wherein, in operation, its cushion is contained at least in part by a hollow wall structure formed at least partly from flexible material and inflatable by pressurised gas to conform to a desired shape, the wall structure having internal wall means which at least partly define a chamber deformable consequent on deflection of the wall structure, means for supplying gas to said chamber, and gas flow means interconnecting said chamber and another space associated with the wall structure so that gas flow from said chamber to said space is at a lower rate than gas flow to said chamber, whereby deflection-induced oscillation of the wall structure is damped.

The invention is equally applicable to wall structures which have means for forming cushion-containing curtains of moving fluid (e.g. gas) from their lower parts and to wall structures devoid of such means.

Figure 4:
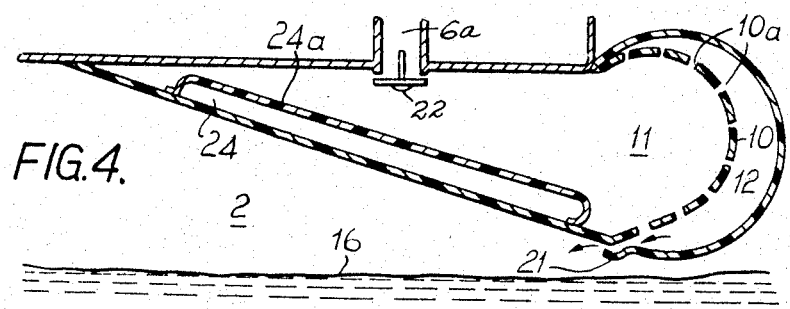
Figure 5:
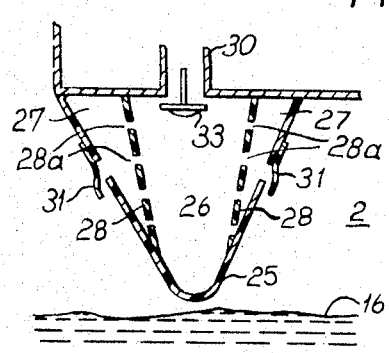
Figure 6:
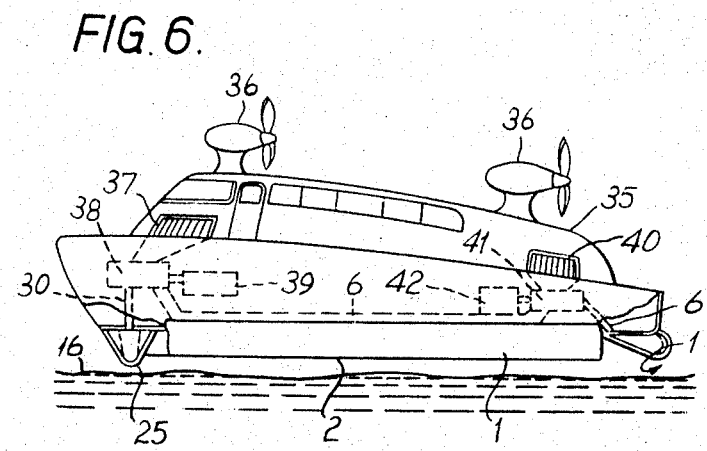

Embodiments of the invention will now be described, by way of example, with reference to the accompanying diagrammatic drawings, wherein:

FIGURE 1 is a fragmentary vertical cross-section of part of a gas-cushion vehicle, FIGURES 2 to 4 are views similar to FIGURE 1 and illustrate modifications of the wall structure shown therein, FIGURE 5 is a fragmentary vertical cross-section of a further embodiment, and FIGURE 6 is a side view partly in section, of a gas-cushion vehicle provided with two forms of wall structure.

With reference first to FIGURE 1, a gas-cushion vehicle 5 is supported above a land surface 16 by a cushion 2 of compressed air. The cushion 2 is contained in part by a hollow wall structure 1 formed from flexible material and inflatable by pressurised air to conform to the shape shown, and in part by an air curtain 8 which issues from a port 7 formed in the bottom of the wall structure 1. The wall structure has internal wall means comprising a perforated diaphragm 10 which defines, with the bottom surface 4 of the vehicle body 17 and the inner wall 3a of a duct 3, an internal damping chamber 11 deformable consequent on deflection on the wall structure. Gas is supplied to the chamber 11 by way of a non-return valve 14 and perforations 10a in the diaphragm 10 interconnect the chamber 11 and a space 12 associated with the wall structure, so that, as hereinafter explained, gas flow from the chamber 11 to the space 12 is at a lower rate than gas flow to the chamber 11, whereby deflection-induced oscillation of the wall structure is damped.

In further detail, the duct 3 is of substantially rigid construction and forms the inner (i.e. cushion-facing) side of the wall structure 1. The remainder of the wall structure 1 comprises a sheet 20 of rubberised fabric extending between the port 7 and an anchorage 17a on the periphery of the vehicle body 17. The diaphragm 10 is also of rubberised fabric, and extends between the anchorage 17a and the lower edge of the inner wall 3a of duct 3. The duct 3 is of rectangular (vertical) cross-section and is pivotally connected to the bottom surface 4 of the vehicle body 17, the inner wall 3a of the duct being attached to said surface by a hinge 18 and the outer wall 3b thereof by a flexible seal 19. Inflation and curtain-forming gas (air) is fed to the upper end of the duct 3 through a duct 6.

The inner wall 3a of the duct 3 is perforated by a port 13 and the non-return valve 14 controls air flow from the duct 3 through this port, allowing only a flow of air into, and not out of, the chamber 11. A relatively free flow of air can take place, through the port 13, into the chamber 11 but the perforations 10a in the diaphragm 10 are so small that there is a resistance to the flow of air from the chamber 11 to the space 12 so that this outward flow is relatively restricted. Thus an asymmetric exchange flow of air takes place between the chamber 11 and the remainder of the wall structure 1.

An exchange flow of air can also occur between the duct 3 and the space 12 through one or more orifices 15 at the lower end of the duct 3.

In operation, under normal conditions, pressurised air (or some other gas) is fed to the duct 3 by way of the duct 6. Some air issues from the supply port 7 to form the curtain 8 and the remainder flows into the chamber 11 and space 12 to inflate the remainder of the wall structure 1. The air pressures in the duct 3, chamber 11 and space 12 will thus be substantially the same. If the clearance between the bottom of the wall structure 1 and the surface 16 decreases, as when the vehicle rolls, pitches or heaves, or passes over an obstacle, the pressure in the space occupied by the cushion 2 increases, to deflect the duct 3 upwardly. Deflecting the duct 3 upwardly deforms the chamber 11 to reduce the volume thereof and initially increase the air pressure therein so that the valve 14 closes. Excess pressure in the chamber 11 also causes air to flow through the perforations 10a of the diaphragm 10 and into the space 12, the work done during flow through the diaphragm 10 damping out deflection-induced oscillations of the wall structure 1. From the space 12, excess air is vented through the orifice 15 so that it combines with the flow of curtain-forming air flowing through the port 7.

When conditions initiating a change in pressure of the cushion 2 return to normal, air pressure in the chamber 11 restores the duct 3 downwardly to its original position. The valve 14 can then open and air pressure will equalise across the port 13. Air pressure will also equalise across the orifice 15. The wall structure 1 will then have its original shape and position.

The respective volumes of the chamber 11 and space 12, and the air flow rate through the perforations 10a of the diaphragm 10, can be arranged to give the desired damping characteristic. For high frequency variations in wall structure 1 to surface 16 clearance, very small flows of air will need to occur through the diaphragm 10 and deflection of the structure 1 will be accompanied by rapid variations in pressure in the chamber 11. For slower variations in structure-to-surface clearance, larger flows of gas will need to occur through the diaphragm 10, thus reducing the maximum pressure in chamber 11 to a value below that which would normally occur. This reduces the downward loading on the duct 3 and, of course, the upward loading on the bottom surface 4 of the vehicle body. The wall structure 1 will tend to have a natural frequency of deflection and the vehicle will also have a natural frequency of movement in roll, pitch and heave. The air flow rate through the diaphragm 10 can be arranged to provide the damping required at one or more of these frequencies, preventing build-up of the movement of wall structure and/or vehicle.

Instead of the wall structure being inflated by the curtain-forming air, a separate supply of inflation air can be provided. This modification is illustrated in FIGURE 2, in which components similar to those in FIGURE 1 bear the same reference numerals. Curtain-forming air continues to be fed from the duct 6 but air for inflating the wall structure 1 is fed direct to the chamber 11 by way of a further duct 6a. Excess air is vented from the space 12 through a flap valve 21, and thereafter combines with the air forming the curtain 8. Although the valve 21 is shown in the open position in FIGURE 2, this is for clarity only; the valve is normally kept shut by the pressure in the duct 3. If the air pressures in the chamber 11 and space 12 are normally the same as the pressure in duct 3, when the wall structure 1 is in an undeflected position, valve 21 can be unbiased, but if, in this position, the former pressures are normally above that in duct 3, then the valve 21 will need to be biased to maintain it closed until the pressure in the space 12 increases further as a result of deflection of the wall.

In the example illustrated in FIGURE 2, the duct 3 is of flexible construction, being held stiff by the pressure of the flow of air therethrough.

The operation of the modified wall structure illustrated in FIGURE 2 is very similar to that of FIGURE 1. It is, however, necessary for the supply of air through the duct 6a to be capable of increasing in step with the pressure increase in chamber 11 as the wall structure deflects. This can be obtained by employing well-known means. Alternatively, a non-return valve 22 can be provided at the outlet end of duct 6a, as shown. On upward deflection of the wall structure 1, the pressure in the deformed chamber 11 rises so that air flows at a low rate through the perforations 10a of the diaphragm 10 to damp out deflection-induced oscillation of the wall structure 1. Excess air in the space 12 flows to the port 7 by way of the non-return valve 21.

Wall structures which do not have means for forming curtains from their lower parts can also form part of the invention. For example, with reference to FIGURE 3, the duct 3 (of FIGURE 2) can be omitted, the valve 21 now venting the space 12 directly to the surrounding atmosphere. Stiffness of the cushion-facing side of the wall structure which was provided by the duct 3 can now be provided by making the inner part 23 of stiff material. Alternatively, as illustrated by FIGURE 4, stiffness of the cushion-facing side can be provided by a side-by-side disposed series of inflated tubes 24. The tubes are inflatable through inlets 24a. FIGURE 4 also illustrates a further modification wherein non-return valves 21 vent the space 12 to the cushion 2.

Another form of wall structure is illustrated in FIGURE 5. The wall structure 25 illustrated therein is divided by diaphragm 28 into a central damping chamber 26 flanked by two spaces 27. Inflating air is fed to the chamber 26 by way of a duct 30. The diaphragms 28 are similar to the diaphragms 10 in FIGURES 1 and 2, having perforations 28a therein. Excess air is vented from the spaces 27 by way of non-return flap valves 31 provided in the outer walls of the wall structure 25. The valves 31 are normally in the closed position but are shown in the open position for clarity. As in the example illustrated in FIGURE 2, either the air pressure supplied through the duct 30 must be capable of increasing in step with any pressure rise in the chamber 26 or a non-return valve is required, for example as indicated at 33.

Although being considerably different in shape, the operation of the arrangement illustrated in FIGURE 5 is similar to that of the arrangements in FIGURES 1 and 2. Deflection of the wall structure 25 either towards or away from the cushion 2 increases, by deformation, the pressure in chamber 26 so that air flows through the perforations 28a of the diaphragm 28 at a lower rate than air flow to the chamber 26, to damp out deflection-induced oscillations of the wall structure. Excess air can be vented from either of the spaces 27 by way of the associated valve 31.

FIGURE 6 illustrates a gas-cushion vehicle 35 in which the supporting cushion 2 is contained at the sides and rear by a wall structure 1 of the form illustrated in any of FIGURES 1 to 4, and at the front by a wall structure 25 of the form illustrated in FIGURE 5. The form of wall structure at any particular position can be varied. Wall structures without means for forming air curtains can be used all round the periphery of the cushion, as can also wall structures with air curtains.

The vehicle 35 is propelled over the surface 16 by airscrew propulsion units 36. Air for the wall structure 25 is drawn in from the atmosphere through side intakes 37, is compressed by an air compressor 38 driven by an engine 39 and is fed thereafter to the structure 25 through the duct 30.

Air for the wall structure 1 is drawn in from the atmosphere through side intakes 40, compressed by an air compressor 41 driven by an engine 42 and is thereafter fed to the structure 1 through ducts 6.

The space occupied by the cushion 2 can be subdivided by wall structures of the forms illustrated, to provide support of the vehicle by a plurality of separate cushions.

Although, in the above examples, air has been mentioned as an inflating gas, other gases (e.g. engine exhaust gases) or air/other gas mixtures can be used. Similarly, fluids other than air can be used for forming the cushion-containing curtains.

I claim:

1. A gas-cushion vehicle wherein, in operation, the vehicle supporting cushion is contained, at least in part, by a wall structure of hollow form attached to the vehicle body and movable relative thereto, comprising means for inflating the wall structure to conform to a desired shape, wall means defining first and second chambers within the wall structure, said first chamber being deformable by deflection of the wall structure towards the vehicle body, means for supplying pressurised gas to the first chamber, means for allowing a flow of gas to pass from the first chamber to the second chamber at a lower rate than the supply of gas to said first chamber, whereby deflection-induced oscillation of the wall structure relative to the vehicle body is damped, and vent means for relieving excess pressure of gas in the second chamber.

2. A vehicle as claimed in claim 1 wherein said wall means include a perforated diaphragm of flexible material.

3. A vehicle as claimed in claim 1 wherein said wall structure is provided with means for forming a cushion-containing gas curtain between the bottom of the wall structure and the surface beneath the vehicle, and wherein the gas forming the curtain includes excess gas vented from said second chamber.

4. A vehicle as claimed in claim 1 wherein said second chamber is vented to atmosphere by way of non-return valve means.

5. A vehicle as claimed in claim 1 wherein said second chamber is vented to the cushion space beneath the vehicle by way of non-return valve means.

6. A vehicle as claimed in claim 1 wherein said means for supplying pressurised gas to said first chamber include non-return valve means.

7. A vehicle as claimed in claim 1 wherein at least part of the cushion-facing side of said wall structure is of said wall structure is of substantially rigid material.

8. A vehicle as claimed in claim 1 wherein pressurised gas is supplied to said first chamber by way of a duct formed within said wall structure, said duct being at least partly defined by the cushion-facing side of the wall structure.

9. A vehicle as claimed in claim 1 wherein the cushion-facing side of the wall structure is stiffened by a plurality of inflated cells.

10. A vehicle as claimed in claim 1 including a further chamber within the wall structure and means for allowing a flow of gas to pass from the first chamber to the further chamber at a lower rate than the supply of gas to said first chamber.

References Cited

UNITED STATES PATENTS 3,253,667   5/1966   Mackie _____ 180—7

A. HARRY LEVY, *Primary Examiner.*